United States Patent
Drahm et al.

(10) Patent No.: US 8,714,027 B2
(45) Date of Patent: May 6, 2014

(54) MAGNETO-INDUCTIVE FLOW MEASURING SYSTEM AND METHOD

(75) Inventors: Wolfgang Drahm, Erding (DE); Stefan Heidenblut, Freising (DE); Frank Schmalzried, Freising (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 176 days.

(21) Appl. No.: 13/265,394

(22) PCT Filed: Apr. 8, 2010

(86) PCT No.: PCT/EP2010/054651
§ 371 (c)(1),
(2), (4) Date: Oct. 20, 2011

(87) PCT Pub. No.: WO2010/121908
PCT Pub. Date: Oct. 28, 2010

(65) Prior Publication Data
US 2012/0036941 A1    Feb. 16, 2012

(30) Foreign Application Priority Data
Apr. 21, 2009    (DE) .......................... 10 2009 002 539

(51) Int. Cl.
G01F 1/58    (2006.01)
(52) U.S. Cl.
USPC ..................................................... 73/861.12
(58) Field of Classification Search
USPC ......................................... 73/861.11–861.17
See application file for complete search history.

(56) References Cited

U.S. PATENT DOCUMENTS

| | | | | |
|---|---|---|---|---|
| 6,094,992 | A * | 8/2000 | Mesch et al. ............... | 73/861.15 |
| 6,634,238 | B2 * | 10/2003 | Budmiger .................. | 73/861.17 |
| 7,117,750 | B2 | 10/2006 | Brockhaus | |
| 8,408,070 | B2 * | 4/2013 | Matzen ..................... | 73/861.12 |
| 2008/0016967 | A1 | 1/2008 | Schrag | |
| 2008/0262796 | A1 | 10/2008 | Rufer | |

FOREIGN PATENT DOCUMENTS

| | | | |
|---|---|---|---|
| DE | 4437275 | A1 | 4/1996 |
| DE | 19637716 | C1 | 4/1998 |
| DE | 198 43 808 | A1 | 3/2000 |
| DE | 10260561 | A1 | 7/2004 |

(Continued)

OTHER PUBLICATIONS

English Translation of the IPR.

(Continued)

Primary Examiner — Jewel V Thompson
(74) Attorney, Agent, or Firm — Bacon & Thomas, PLLC

(57) ABSTRACT

A method for operating a magneto-inductive flow measuring system, wherein the magneto-inductive flow measuring system has a measuring tube, wherein measuring tube has a lumen for the conveying an at least slightly electrically conductive, measured substance, and wherein the magneto-inductive flow measuring system has a first and a second electrode electrically interacting with the measured substance. In a first diagnostic operation, an input voltage is applied between the first and second electrodes, wherein the input voltage produces an electrical current essentially within the lumen, and wherein the flow measuring system additionally has a third and a fourth electrode electrically interacting with the measured substance, wherein an output voltage falling between the third and fourth electrodes essentially due to the electrical current is determined, and wherein, by means of the output voltage, a state of the flow measuring system and/or a chemical and/or physical property of the measured substance is determined.

10 Claims, 8 Drawing Sheets

(56) References Cited

FOREIGN PATENT DOCUMENTS

| DE | 102006033112 A1 | 1/2008 |
| DE | 10 2007 014 469 A1 | 9/2008 |
| DE | 102008005258 A1 | 7/2009 |
| EP | 1108989 A1 | 6/2001 |
| WO | WO 2006/051337 A1 | 5/2006 |

OTHER PUBLICATIONS

German Search Report.
International Search Report.

* cited by examiner

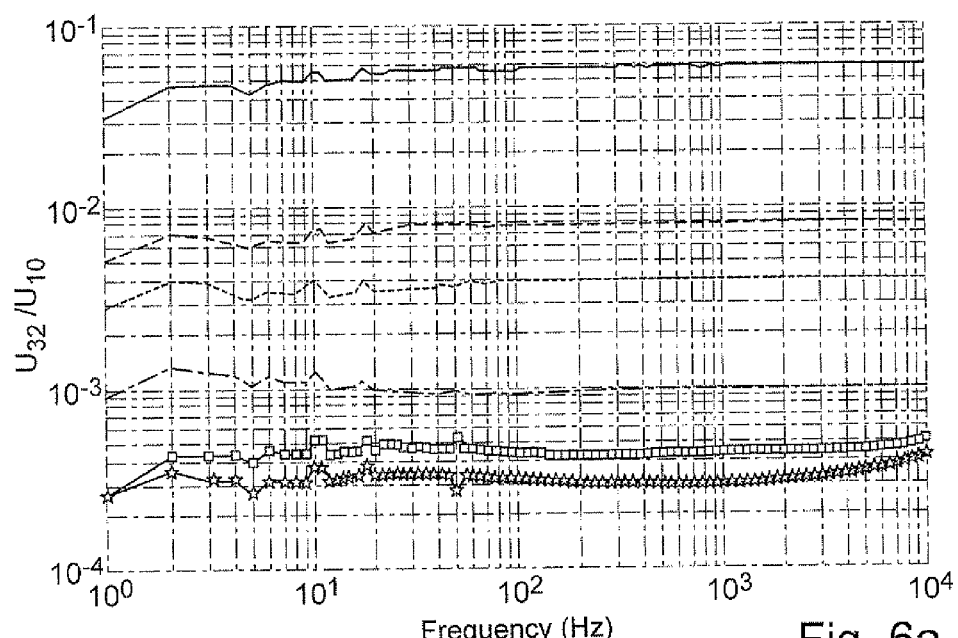
Fig. 6a
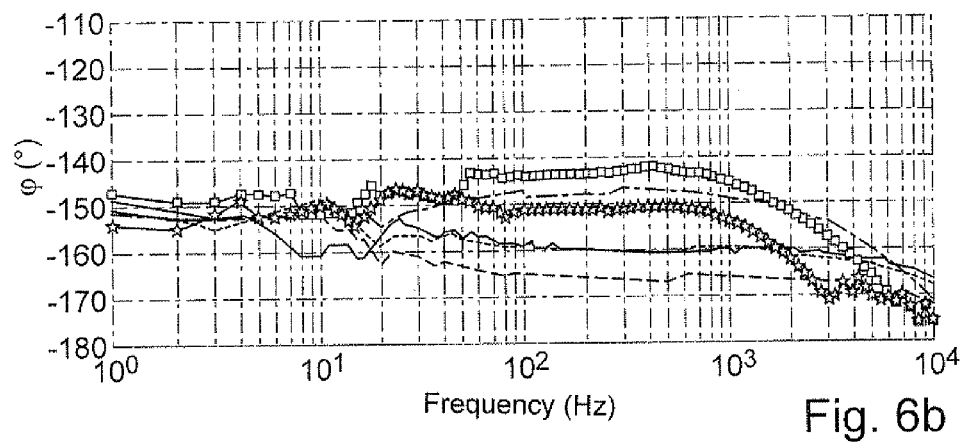
Fig. 6b
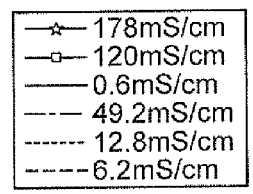

MAGNETO-INDUCTIVE FLOW MEASURING SYSTEM AND METHOD

TECHNICAL FIELD

The invention relates to a method for operating a magneto-inductive flow measuring system, wherein the magneto-inductive flow measuring system has a measuring tube, which measuring tube has a lumen for conveying an at least slightly electrically conductive, measured substance, wherein the magneto-inductive flow measuring system has a first and a second electrode electrically interacting with the measured substance, wherein, in a first diagnostic operation, an input voltage is applied between the first and the second electrode, and wherein the input voltage produces an electrical current essentially within the lumen.

Furthermore, the invention concerns a magneto-inductive flow measuring system comprising: a measuring tube, which has a lumen for conveying an at least slightly electrically conductive, measured substance; and a first and a second electrode electrically interacting with the measured substance, wherein the first and second electrodes serve to produce an electrical current essentially within the lumen.

BACKGROUND DISCUSSION

Magneto-inductive flow measuring systems are often used in plants of process and/or automation technology for determining volume flow or mass flow. For volumetric flow measurement, magneto-inductive flow measuring systems utilize the principle of electrodynamic induction: charge carriers of the measured substance moved perpendicularly to a magnetic field induce a voltage in electrodes likewise arranged essentially perpendicular to the flow direction of the measured substance and perpendicular to the direction of the magnetic field. The measurement voltage induced in the measured substance and accessed by means of the electrodes is proportional to the flow velocity of the measured substance averaged over the cross section of the measuring tube, and thus to the volume flow rate. If the density of the measured substance is known, the mass flow in the pipeline or the measuring tube can be determined. The measurement voltage is usually accessed via the electrode pair, which is arranged in the measuring tube region, in which the maximum magnetic field strength, and thus the maximum measurement voltage, is to be expected. The electrodes are usually galvanically coupled with the measured substance; however, magneto-inductive flow measuring systems with contactless, capacitively coupling electrodes are also known.

The measuring tube can be manufactured either from an electrically conductive material, e.g. stainless steel, or it can be composed of an electrically insulating material. If the measuring tube is manufactured of an electrically conductive material, it must then be lined in the region coming in contact with the measured substance with a lining—the so-called liner—made of an electrically insulating material. The liner is, depending on temperature and measured substance, composed, for example, of a thermoplastic, a thermosetting or an elastomeric synthetic material. However, magneto-inductive flow measuring systems with a ceramic lining are also known.

In the case of use of electrodes contacting a measured substance, at the interface between the electrode and the measured substance flowing through the measuring tube, galvanic elements form, which bring about an electrochemical disturbance potential. This electrochemical disturbance potential is variable, and dependent on different, changing, environmental conditions, such as temperature, pressure, composition of the measured substance, material of the electrodes and material of the measuring tube. It is evident that an electrochemical potential which changes over time negatively influences the accuracy of measurement of a conventional magneto-inductive flow measuring system. Methods have therefore become known for eliminating these disturbance signals. Galvanic elements which bring about an electrochemical disturbance potential can also arise due to accretion deposited from the measured substance onto the electrodes or onto the lining. Such accretion can additionally lead to corruption of the measured values.

In Offenlegungsschrift DE 102006033112 A1, a method is disclosed for operating a flow measuring device, especially for determining the electrical conductivity of the measured substance flowing through the measuring tube. For such purpose, a first electrode is supplied with a signal in the form of an electrical current or a voltage, and at a second electrode, which is not supplied with the signal, impedances, electrical currents or voltages are ascertained. From a comparison of currently measured values with stored values, the electrical conductivity of the measured substance is determined, and/or an accretion formation on the electrodes is recognized.

Another method is known from EP 1536211 A1. There, for determining, among other things, the electrical conductivity of the measured substance, resistance values gained by means of a so-called 2-point and/or 3-point measuring are compared with one another. The 2-point or 3-point measuring occurs, in such case, by means of measuring electrodes and at least one additional electrode.

Currently known methods have the disadvantage that the measuring range for determining the electrical conductivity of a measured substance is limited, since, due to polarisation phenomena, the impedance measured on the electrodes starting from a conductivity of about 1 mS/cm is strongly frequency-dependent and complex.

Such polarization effects occur when an electrical current flows through the interface between the measured substance and electrode, since charge carriers present in the measured substance are deposited on the electrode, and thus influence the measurement voltage.

SUMMARY OF THE INVENTION

An object of the invention is therefore to determine a state of a magneto-inductive flow measuring system or a physical and/or chemical property of the measured substance reliably, and especially also in the case of electrical conductivities of the measured substance greater than 1 mS/cm.

The object is achieved by a magneto-inductive flow measuring system and a method for operating a magneto-inductive flow measuring system.

The object as regards the method is achieved according to the invention by features including that the magneto-inductive flow measuring system additionally has a third and a fourth electrode electrically interacting with the measured substance, that an output voltage falling between the third and the fourth electrodes essentially due to the electrical current is determined, and that by means of the output voltage, a state of the flow measuring system and/or a chemical and/or physical property of the measured substance is determined.

Via the input voltage applied between the first and second electrodes, an electrical current can be produced essentially within the lumen. For this purpose, for example, a voltage can be applied, for example via a series resistor at the first electrode. The lumen of the measuring tube can, in such case, be filled, for example, with an at least slightly electrically conductive, measured substance. Depending on the voltage applied between the first and second electrodes, an alternating electrical current or a pulsating direct current, for example, can be produced. As the first and second electrodes, electrodes in wetting contact with the measured substance can be used, for example. For such purpose, especially electrodes protruding into the lumen of the measuring tube or electrodes closing off a bore in a wall of the measuring tube can be provided. The electrical current then flows within the lumen, for example along an electrical flux field forming between the first and second electrodes. The electrical current is, for example, composed of charge carriers contained in the measured substance. The electrical flux field can be used for describing the spatial distribution of the electrical current. The electrical flux field can especially extend, for example, spatially between the first and the second electrode, but at least extends within the lumen of the measuring tube, and even into an adjoining pipeline. Within this electrical flux field, along which the electrical current flows within the lumen, a third and fourth electrode—which, for example, likewise are in wetting contact with the measured substance, or at least electrically interact with the measured substance—can be arranged. In this way, the output voltage falling between the third and fourth electrodes can be measured. The output voltage is, in such case, essentially measured without electrical current flow, due to, for example, high impedance elements—such as, for example, an operational amplifier—being connected with the third and/or the fourth electrode. By means of this output voltage falling between the third and the fourth electrode, for example, a state of the magneto-inductive flow measuring system, or a physical and/or chemical property of the measured substance, can then be determined.

Via the proposed method, the disturbance effects arising due to the polarization on the electrical current carrying electrodes, i.e. on the first and the second electrodes, can be avoided or at least lessened. The method of the invention can be performed, for example, when the measured substance is flowing through the measuring tube. Alternatively, the method can be applied when the measured substance is at rest in the measuring tube or the measuring tube is emptied, i.e. is free of the measured substance. The state of the flow measuring system and/or a chemical and/or physical property of the measured substance can be determined, especially by means of a characteristic variable, via computer or based on stored data. To this end, the magneto-inductive flow measuring system can be calibrated, for example, with a reference measured substance. The values measured in such case for the output voltage can then be stored, for example, in an evaluation unit and an association formed between them and a state of the magneto-inductive flow measuring system or a chemical and/or physical property of the measured substance. For example, corrosion of the electrodes or leakage of the measuring tube can be determined thereby.

In an embodiment of the method, the electrical conductivity of the measured substance or a variable associated with the electrical conductivity is determined by means of the output voltage. Electrical conductivity can be used as a process variable for product monitoring, for process control, for determining concentration of a component in the measured substance and/or as a diagnostic parameter, especially for detection of conductive accretions, especially accretions on the wall of the measuring tube or on the electrodes of the magneto-inductive flow measuring system.

The magneto-inductive flow measuring system can be calibrated in such a manner that, from the output voltage, the electrical conductivity of the measured substance or a variable associated with the electrical conductivity can be determined. At least slightly electrically conductive, measured substances, such as, for example, solutions—especially salt solutions—of various concentrations can serve as reference measured substances for calibrating. The calibrating of the magneto-inductive flow measuring system can then occur, for example, based on a reference measuring device for determining electrical conductivity. This can occur, for example, by assigning the output voltage falling between the third and fourth electrodes to a value of the electrical conductivity, which was determined, for example, by means of the reference measuring device.

In an embodiment of the method, the input voltage applied between the first electrode and the second electrode, which serves for impressing an essentially constant electrical current, is determined. The electrical current can be impressed, for example, on the first electrode, i.e. a constant value of the electrical current is maintained. The input voltage required for impressing the electrical current—and, for example, applied on the first electrode—can be measured for evaluation purposes, such as, for example, for determining a state of the flow measuring system and/or a property of the measured substance. The first diagnostic operation can thus be performed in a resource-saving and especially in a time-saving manner, especially during short time pauses in the measurement operation for determining mass flow and/or volume flow. The first diagnostic operation can be performed, for example, during reversal of the poling of the magnet system. Alternatively, in the case of measured substances having a certain (minimum) electrical conductivity, the electrical current through the lumen can be set essentially by the voltage applied between the first and second electrodes and by a series resistor. An (additional) measuring of the electrical current can then be omitted. This offers the advantage that during the first diagnostic operation, the electrical current flowing essentially within the lumen need not supplementally be measured. On the other hand, the opportunity exists to apply an essentially constant input voltage and to determine the electrical current between the first and the second electrode.

In an additional embodiment of the method, an input impedance present between the first electrode and the second electrode is determined. The input impedance can be determined, for example, from the voltage falling between the first and the second electrodes, and the electrical current flowing essentially within the lumen. The input impedance can, in such case, especially, be complex, wherein the real part of the input impedance corresponds to an ohmic resistance and the imaginary part to a reactance. This reactance, and, consequently, resulting polarization effects, is brought about especially due to an electrochemical disturbance potential present on the electrical current carrying electrodes. The input impedance can additionally also be dependent on the frequency of an alternating current flowing between the first and the second electrode.

Another characteristic variable for determining the state of the magneto-inductive flow measuring system or a chemical and/or physical property of the measured substance can be, for example, a value for the transfer function between the input and the output voltage, or a parameter of this transfer function, such as, for example, input- or output-, forwards- or backwards-impedance or admittance. In an additional embodiment of the method, from a comparison between the input voltage and/or the input impedance and the output voltage, a state of the magneto-inductive flow measuring system and/or a physical and/or chemical property of the measured substance is deduced. From the comparison, an accretion can be detected, for example, present in given cases and covering at least one of the electrodes or the liner at least sectionally, and suitable measures, e.g. a report to the user, an automatic correction, for example, of the measured values and/or a cleaning of the electrodes can be performed.

An accretion deposited on the wall of the measuring tube, on the liner and/or on the electrodes can have an electrical conductivity smaller or greater than that of the measured substance. Depending on the type of accretion, the electrical conductivity of the accretion, especially one deposited from the measured substance, can be greater or smaller than the electrical conductivity of the measured substance. Due to the thickness and/or the electrical conductivity of the accretion, the electrical flux field of the electrical current extending essentially within the lumen or the electrical potential within the lumen can be deformed. From the relationship between the input voltage and/or the input impedance relative to the output voltage, an accretion present, in given cases, and especially the thickness of the accretion, can be detected. For evaluation purposes, the values obtained by means of the relationship can be compared, for example, with stored values.

In a form of embodiment of the method, a relationship is formed between the output voltage and the input voltage and/or the input impedance. In this regard, the quotient of the input voltage and the output voltage can be formed, for example. Additionally, by means of a calibrating, an association between the aforementioned relationship and a state of the magneto-inductive flow measuring system and/or a physical and/or chemical property of the measured substance can be determined.

In another form of embodiment of the method, by means of the relationship, an accretion is detected, which is present, in given cases, on an inner wall of the measuring tube and/or on the first, second, third and/or fourth electrode, and is especially deposited from the measured substance. The relationship between the output voltage, the input voltage and/or the input impedance relative to the thickness of the deposit can be determined, for example, by calibration.

In an embodiment of the method, a thickness of the accretion and/or a ratio between the conductivity of the measured substance and the conductivity of the accretion is determined, especially by means of the relationship.

In a further development of the method, at least one value obtained by means of the relationship is compared with at least one stored value. The detection of an accretion present in given cases can be determined by comparing measured or calculated values for the input voltage and/or the input impedance and the output voltage.

In an additional embodiment of the method, the electrical conductivity of the measured substance and/or the electrical conductivity of the accretion is determined. During a suitable calibrating, from measured or calculated values, the electrical conductivity of the accretion and of the measured substance, or a ratio between the electrical conductivity of the accretion and of the measured substance, can be determined.

In a manner of execution of the method, the first, second, third and fourth electrodes are used in measurement operation for monitoring the measured substance and/or for determining flow and/or for determining a reference potential.

In an additional manner of execution of the method, for determining the flow by means of a magnet system, a magnetic field is produced, wherein, via this magnetic field, a measurement voltage is induced in the measured substance flowing through the measuring tube, wherein this measurement voltage is accessed by means of the first, second, third and/or fourth electrode. As the first, second, third and fourth electrode, i.e. as the electrodes for performing the method, the electrodes which are in any event present in a magneto-inductive flow measuring device can be used. In such case, this can be, for example, a measured substance monitoring electrode for detecting partially filled measuring tubes, a reference electrode for determining a reference potential, or at least one of the measuring electrodes for determining a voltage induced in the measured substance.

In an additional manner of execution of the method, measured values produced by the flow measuring system are corrected as a function of the ratio of the electrical conductivity of the measured substance to the electrical conductivity of the accretion ascertained in the first diagnostic operation, as well as on the basis of the thickness of the accretion. In this way, the influence of the accretion, in given cases present, on the induced measurement voltage and the cross sectional area of the measuring tube can be corrected.

In a variant of the method, in a second diagnostic operation, the electrical conductivity of the measured substance or the variable associated with the electrical conductivity is determined solely by means of the input voltage and/or the input impedance. In the second operating mode, which can be set, for example, by a user, the electrical conductivity or a variable associated with the electrical conductivity is determined solely from the input impedance and/or the input voltage. As a function of the electrical conductivity of the measured substance, that first or second diagnostic operation can thus be selected, which suffices for the requirements for accuracy and precision in determining the electrical conductivity of the measured substance. The forcing of the electrical current between the first and second electrodes is also dependent on the electrical conductivity of the measured substance and is especially required in the case of electrical conductivities below 1 mS/cm. Additionally, in the case of measured substances with an electrical conductivity below a (minimum) electrical conductivity, as already mentioned, it is necessary to produce the electrical current by means of an electrical current source. This requires a special measuring of the electrical current. The feeding in and measuring of the electrical current and the measuring of the output voltage falling between the third and fourth electrodes requires, however, a certain time to be consumed, so that, especially for reasons of saving time, it can be advantageous to measure only the fed-in electrical current and the input voltage, in order, for example, to determine the electrical conductivity of the measured substance. In this way, the measurement operation can be continued undisturbed.

The object as regards the magneto-inductive flow measuring system is achieved by providing a third and a fourth electrode, which electrically interact with the measured substance, wherein the third and fourth electrodes serve to access an output voltage falling between the third and the fourth electrode essentially as a function of the electrical current.

The accessed output voltage can be evaluated, for example, by means of a control/evaluation unit. The ascertained values can be displayed, for example, on an input/output unit.

BRIEF DESCRIPTION OF THE DRAWINGS

The invention will now be explained in greater detail based on the appended drawing, the figures of which show as follows:

FIG. 6a) is a graphical representation of the transfer function, wherein the transfer function is formed by the quotient of the input voltage and the voltage accessed between the third and fourth electrode;

FIG. 6b) is a graphical representation of the phase of the transfer function as a function of the frequency of an alternating current flowing between the first and second electrodes;

DETAILED DISCUSSION IN CONJUNCTION WITH THE DRAWINGS

Figure 1:
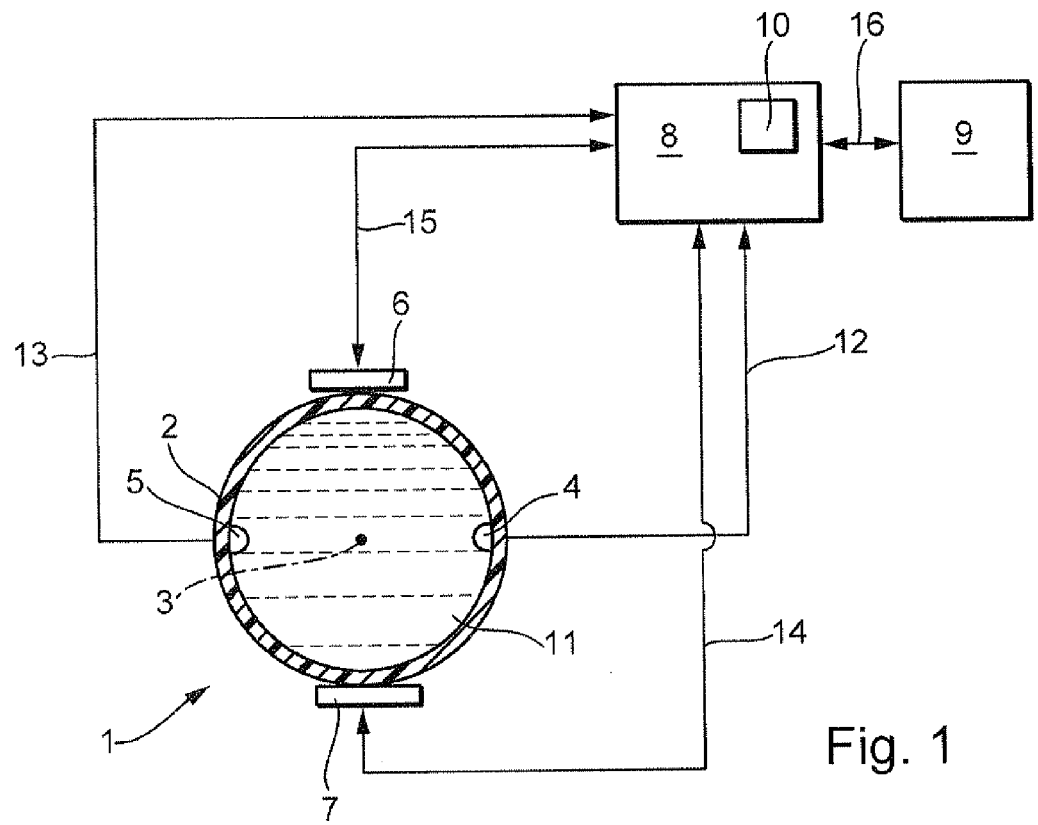
FIG. 1 is a schematic representation of a magneto-inductive flow measuring system.

FIG. 1 shows a schematic representation of a magneto-inductive flow measuring system 1. The measured substance 11 flows through the measuring tube 2 in the direction of the measuring tube axis 3. The measured substance 11 is at least slightly electrically conductive.

Measuring tube 2 is lined on its inner surface with a liner composed of an electrically insulating material, which, in given cases, is, to a large degree, chemically and/or mechanically resistant.

The magnetic field B directed perpendicularly to the flow direction of the measured substance 11 is produced via a magnet system, e.g. via two diametrally arranged coils 6, 7, i.e. two electromagnets. Under the influence of the magnetic field B, charge carriers located in the measured substance 11 migrate, depending on polarity, to the two oppositely poled, measuring electrodes 4, 5. The measurement voltage forming on the measuring electrodes 4, 5 is proportional to the flow velocity of measured substance 11 averaged over the cross section of the measuring tube 2, i.e., it is a measure for the volume flow rate of the measured substance 11 in the measuring tube 2. Measuring tube 2 is, moreover, connected via connection elements, e.g. flanges, with a pipe system supplying and draining the measured substance 11 to and from the measuring tube 2.

The two measuring electrodes 4, 5 are in the shown case mushroom-shaped measuring electrodes, which are in direct contact with measured substance 11. Of course, rod electrodes or any other known types of measuring electrodes are also applicable.

Via electrical connecting lines 12, 13, measuring electrodes 4, 5 are connected with the control/evaluation unit 8. The connection between the coil arrangements 6, 7 and control/evaluation unit 8 occurs via the connecting lines 14, 15. Control/evaluation unit 8 is connected via the connecting line 16 with an input/output unit 9. The memory unit 10 is associated with the evaluating/control unit 8.

In order to produce the relationship between the measured conductance and the electrical conductivity of a measured substance 11, it is necessary to know the geometry of the particular measuring arrangement. The geometry of a measuring arrangement can usually be described by a constant numerical value, which is referred to as the cell constant.

Figure 2:
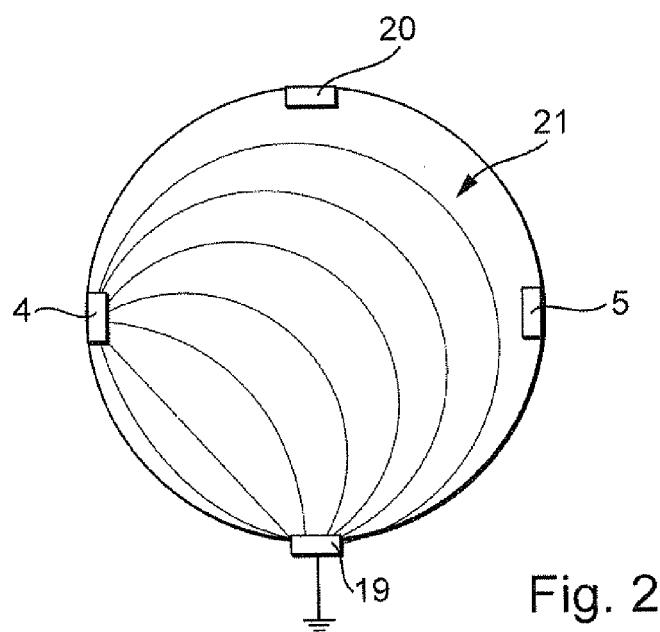
FIG. 2 is a schematic representation of the electrical flux field between a first electrode and a second electrode.

FIG. 2 schematically shows the electrical flux field 21, along which the electrical current produced between the first and second electrodes 4, 19 flows through the lumen. FIG. 2 shows, in such case, a cross section through electrical flux field 21 at a position along the length of the measuring tube 2, at which the first, second, third and fourth electrode 4, 19, 5, are brought into measuring tube 2.

Flux field 21 shows, in such case, the spatial distribution of the electrical current. The flux density of electrical flux field 21 is essentially the greatest along the direct connecting line between the first and second electrodes 4, 19, and decreases with increasing distance from the direct connecting line. The input voltage $U_{10}$ driving the electrical current is present, in such case, on the first electrode 4, while the second electrode 19 is grounded.

Figure 3:
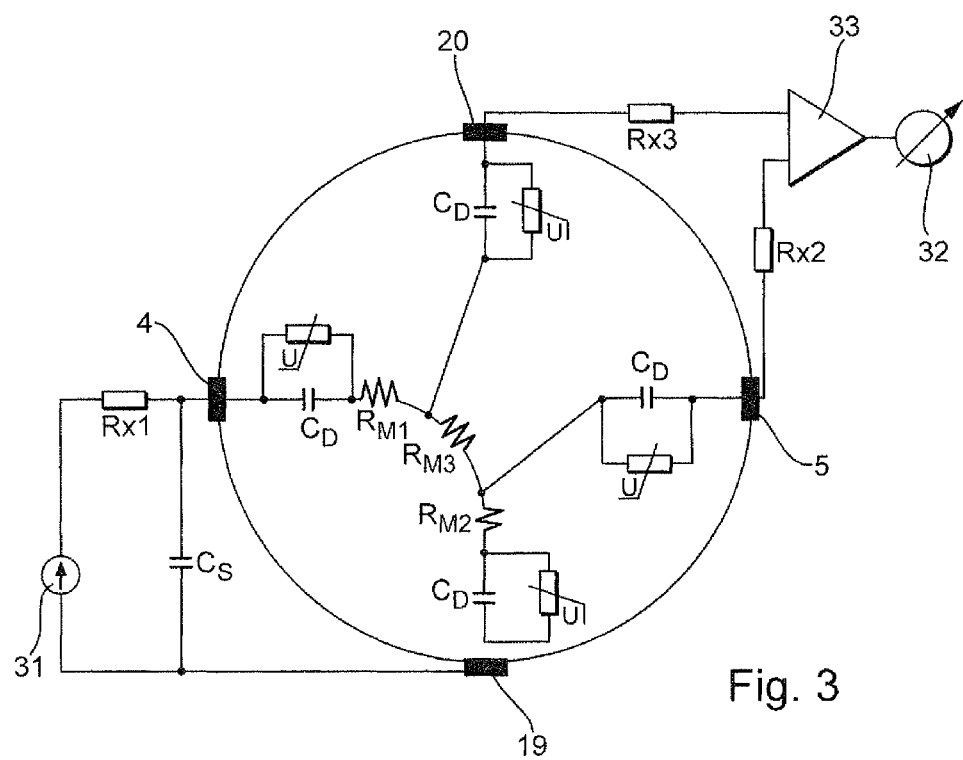
FIG. 3 is an equivalent circuit diagram of a magneto-inductive flow measuring system in a first diagnostic operation.

FIG. 3 shows an equivalent circuit diagram of a magneto-inductive flow measuring system 1. By means of an electrical current source 31, an electrical current is transmitted between the first and second electrodes 4, 19. The equivalent circuit diagram of FIG. 3 is for the case in which the electrical current is an alternating current. The first electrode 4 serves during measurement operation for accessing a voltage induced in measured substance 11 by means of a magnet system 6, 7. The second electrode 19 can be used in measurement operation as, for example, a reference electrode 19. The parasitic capacitances between the first and second electrodes 4, 19 arising in the electrical current circuit connected to the first and second electrodes 4, 19 are equivalently represented by the capacitor CS.

On the interfaces between the first, second, third and fourth electrodes 4, 19, 5, 20 and the measured substance 11, especially due to polarization effects, electrical double layers form, which have a capacitive behavior. This capacitive behavior is equivalently represented by capacitors with capacitance CD. In order to transfer an electrical current between the first and second electrodes 4, 19, due to the electrical double layer, a certain minimum voltage is needed, characterized by a voltage-dependent resistance U.

The third electrode 5 can interact in measurement operation with the first electrode 4, and likewise be used as a measuring electrode 5 for accessing a voltage induced in measured substance 11, while the fourth electrode 20 is used in measurement operation, for example, as a measured substance monitoring electrode 20. The voltage drop between the third and the fourth electrodes 5, 20 is amplified by an amplifier 33, connected to electrodes 5, 20. Due to the high input impedance of amplifier 33, the electrical current flowing via the third and fourth electrodes 5, 20 can be kept small. The output voltage $U_{32}$ between the third and fourth electrodes 5, in the case of an electrical current between the first and second electrodes 4, 19 is, consequently, essentially without electrical current flow, or at least measured by means of a voltmeter 32 having such a high impedance that polarization effects on the third and fourth electrodes 5, 20 are essentially avoided or at least lessened.

Measured substance 11 in the lumen of measuring tube 2 can be considered as a voltage divider, so that the input voltage $U_n$ falling between the first and second electrodes 4, 19 and the output voltage $U_{32}$ falling between the third and fourth electrodes 5, 20 can be taken into consideration for determining the resistance $R_{M3}$.

Figure 4:
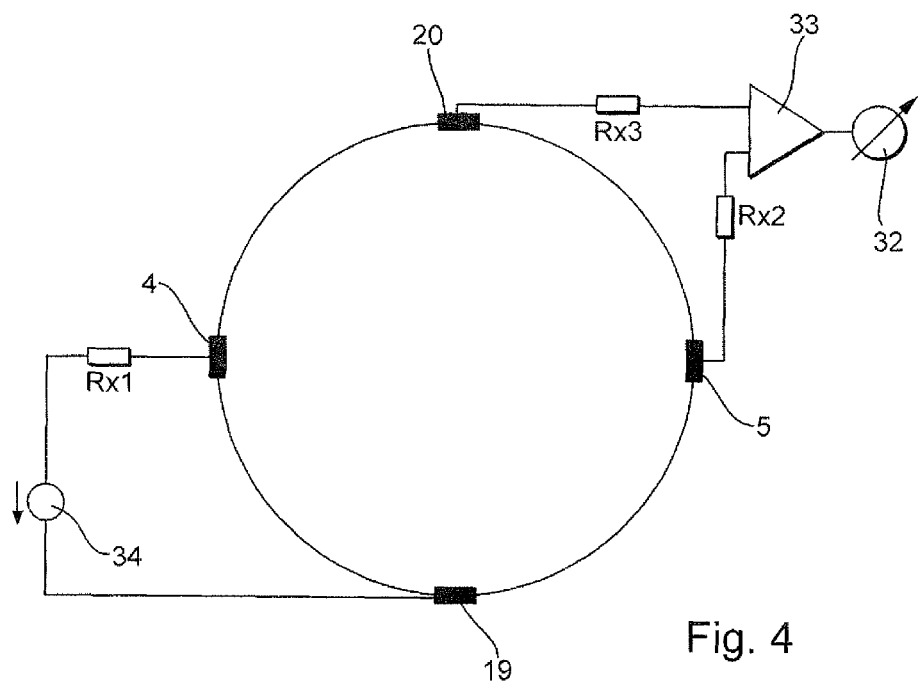
FIG. 4 is another equivalent circuit diagram of a magneto-inductive flow measuring system.

FIG. 4 likewise shows an equivalent circuit diagram of a magneto-inductive flow measuring system 1. In this form of embodiment, the electrical current is produced by means of a voltage source 34. This means that the electrical current flowing through the lumen, or through measured substance 11 located in the lumen is, in the case of a certain (minimum) electrical conductivity of measured substance 11, determined by the applied voltage and the resistance Rx, so that an electrical current source 31 or a voltage source 34 can be omitted. In the case an electrical current source, an electrical current can be impressed, while in the case a voltage source, the electrical current actually flowing between the first and second electrodes must be measured. It should be pointed out that the operation, especially in the first measurement operation of the magneto-inductive flow measuring system 1 shown in FIG. 4, remains unchanged in comparison to that shown in FIG. 3.

Figure 5A:
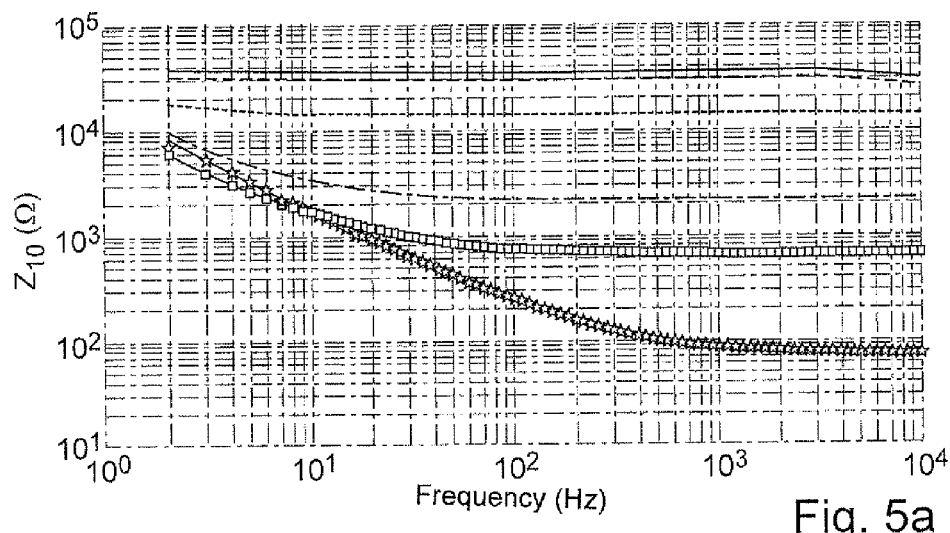
FIG. 5a) is a graphical representation of input impedance as a function of (alternating electrical current) frequency.

FIG. 5a) shows the curve of the magnitude of impedance $Z_{10}$ between the first and second electrodes 4, 19. For electrical conductivities in a range of between 7.7 μS/cm and 63 μS/cm, the magnitude of the impedance $Z_{10}$, as a function of the frequency of the input voltage $U_{10}$, is essentially constant. If, however, the electrical conductivity of the measured substance 11 rises, polarization effects then increasingly occur. The magnitude of impedance $Z_{10}$ in the case of a measured substance 11 with an electrical conductivity of 12 mS/cm displays a clear frequency dependence.

Figure 5B:
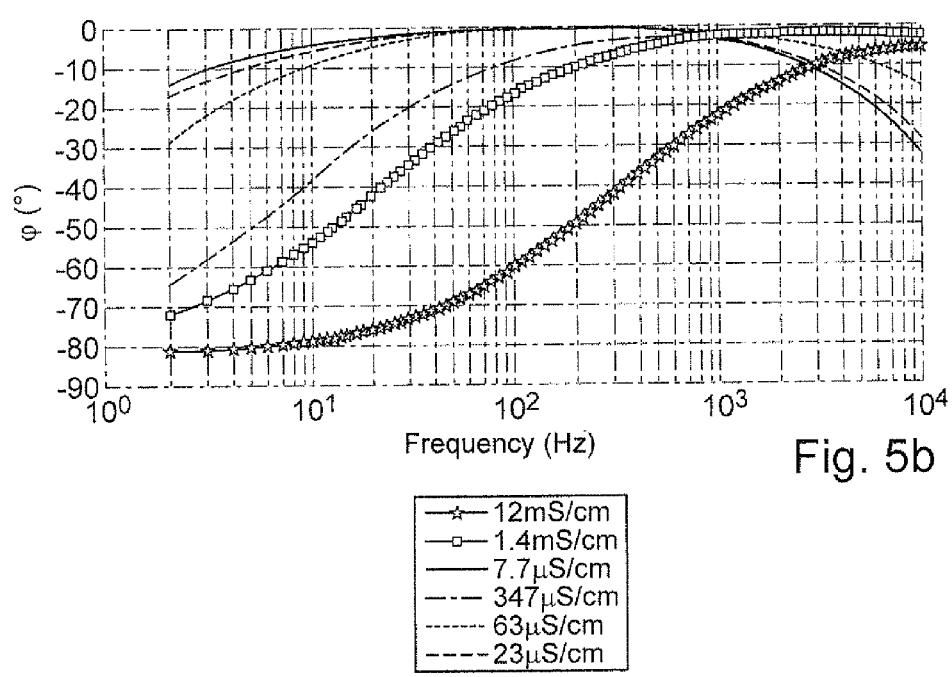
FIG. 5b) is a graphical representation of phase of the input impedance as a function of frequency of an alternating current flowing between the first and second electrodes.

In FIG. 5b), phase is shown as a function of impedance for different electrical conductivities. In the range of relatively small electrical conductivities, i.e. between 7.7 μS/cm and 23 μS/cm, the phase ϕ for frequencies of the input voltage between 10 to 1000 Hz is approximately zero. In the case of increasing electrical conductivity of the measured substance 11, however, the curve of phase ϕ changes due to the increasing influence of the polarization effects. A measuring of the electrical conductivity of a measured substance 11 only by means of the electrical current carrying, first and second electrodes can, consequently, be erroneous.

FIG. 6a) shows a graphical representation of the magnitude of the transfer function as a function of the (alternating electrical current) frequency. The transfer function is formed from the quotient of the output voltage $U_{32}$ divided by the input voltage $U_{10}$. The magnitude of the transfer function in FIG. 6a) is, in the shown frequency range, essentially independent of the frequency of the applied input voltage $U_{10}$. The proposed determining of the electrical conductivity by means of output voltage $U_{32}$ is thus advantageous in comparison to the method known from the state of the art, since it is essentially independent of the frequency of an alternating current applied between the first and second electrodes 4, 19.

Additionally, in FIG. 6b), the curve for the phase ϕ of the transfer function is shown.

Figure 7:
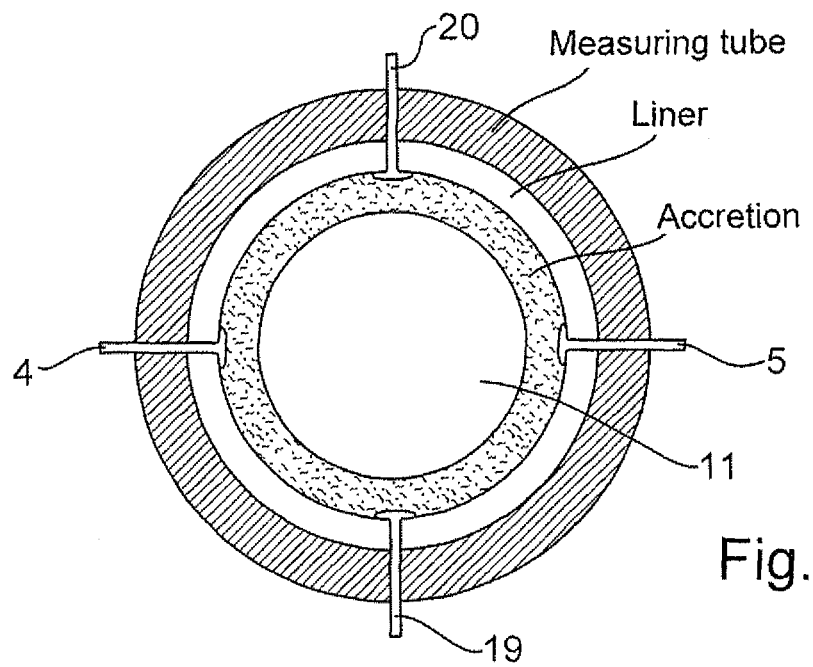
FIG. 7 is a schematic representation of a measuring tube, which has an accretion with an essentially constant thickness.

FIG. 7 shows a cross section through a measuring tube 2 of a magneto-inductive flow measuring system 1. The cross section shows, inserted into the measuring tube 2 at the position along the length of the measuring tube 2 where the measuring electrodes 4, 5 are located, a reference electrode 19 and a measured substance monitoring electrode 20. The measuring tube 2 has a lining and an accretion of uniform thickness ϵ. The electrodes 4, 5, 19, 20 are, due to the accretion, not in direct contact with the measured substance 11. The accretion has an electrical conductivity, which is assumed to be locationally independent. The ratio of the electrical conductivity of measured substance 11 and the electrical conductivity of the accretion is referred to with k. The ratio k is, in such case, given by the formula $k=\sigma_{accretion}/\sigma_{substance}$ wherein $\sigma_{accretion}$ is the electrical conductivity of the accretion, and $\sigma_{substance}$ is the electrical conductivity of the measured substance.

Figure 8A:
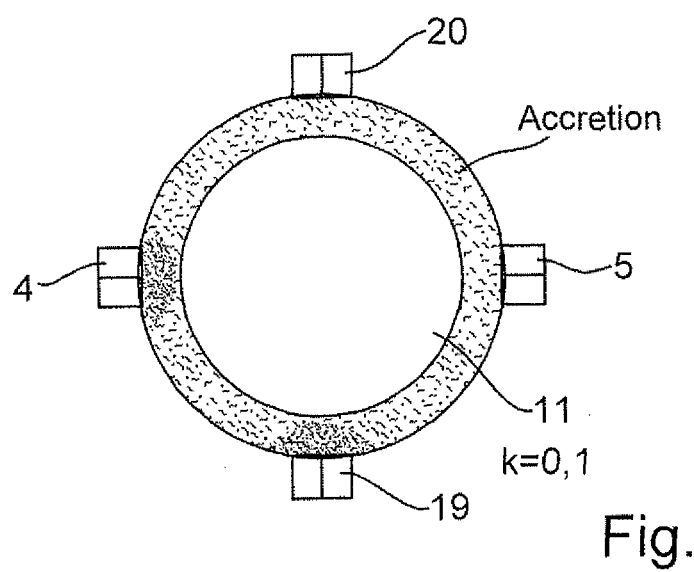
FIGS. 8a), 8b), 8c) are schematic representations of the potential distribution in the case of different electrical conductivities of the accretion.
Figure 8B:
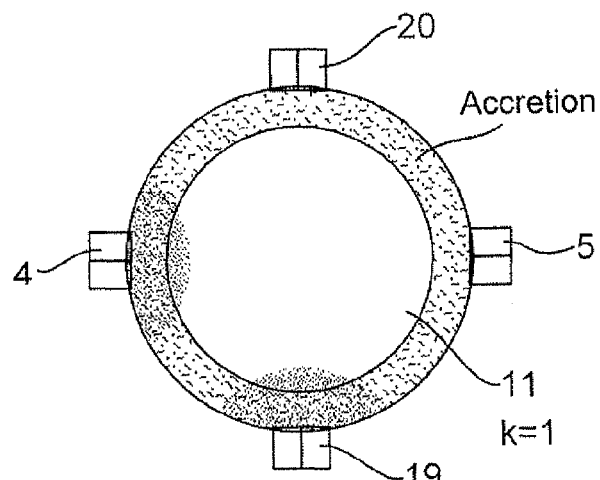
Figure 8C:
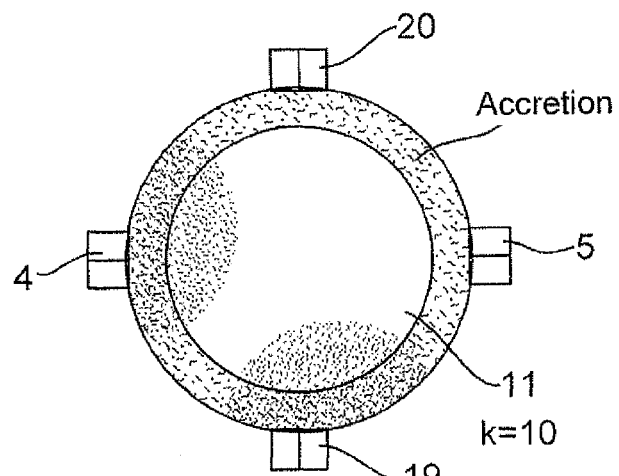

FIG. 8 a), b), c) shows the potential distribution along a cross section of a measuring tube 2 of a magneto-inductive flow measuring system 1, in the case of different values of ratio k of the electrical conductivity of the accretion to that of the measured substance. In such case, the accretion in FIG. 8 a) has the smallest electrical conductivity and the accretion in FIG. 8c) has the greatest electrical conductivity. Due to the electrical conductivity of the accretion, a potential shifting occurs as a function of the value of the electrical conductivity. With this potential shifting is also associated a change of the electrical flux field. Therefore, an accretion which has collected in the lumen or on the electrodes can be detected.

From a simulation of the voltage ratios present in the measuring tube 2 by means of a finite elements method, the following values for different ratios k in the case of a predetermined, constant thickness ϵ of the accretion could be ascertained:

|  | k | | |
| --- | --- | --- | --- |
|  | 0.1 | 1 | 10 |
| input impedance | 9441 | 1329 | 201 |
| transfer function $U_{32}/U_{10}$ | 0.007 | 0.042 | 0.106. |

The input impedance $Z_{10}$ sinks in the face of rising electrical conductivity of the accretion, while the value for the transfer function increases.

Figure 9:
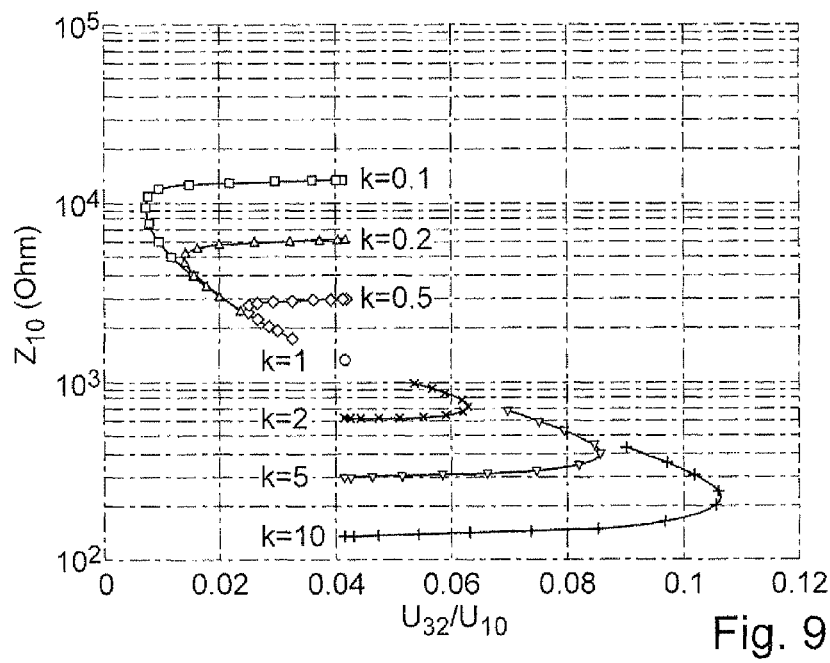
FIG. 9 is a schematic representation of the ratio of the electrical conductivity of the accretion to the electrical conductivity of the measured substance in the case of differing accretion thicknesses.

FIG. 9 shows a representation of the input impedance $Z_{10}$ as a function of the ratio of the output voltage $U_{32}$ to the input voltage $U_{10}$. Along one of the shown so-called isolines for k=0.1; 0.2; 0.5; 1; 2; 5; 10 exists a constant ratio between the electrical conductivity of the measured substance 11 and the electrical conductivity of the accretion. The representation shown in FIG. 9 is separable into four quadrants around the point k=1. In the upper left quadrant, the electrical conductivity of the measured substance is greater than that of the accretion, while in the lower right quadrant, the electrical conductivity of the accretion is greater than that of the measured substance. If the lumen is free of accretion, k can assume a value of approximately one. The points along the isolines designate different thicknesses ϵ of the accretion. If the lumen of the measuring tube 2 is completely filled with accretion, the voltage ratio between input voltage $U_{10}$ and output voltage $U_{32}$ takes a constant value—in the shown example of an embodiment at $U_{32}/U_{10}=0.042$. Via the diagram, or via the values of input voltage $U_{10}$, input impedance $Z_{10}$ and output voltage $U_{32}$, the thickness ϵ of the accretion and/or the ratio k of the electrical conductivities can thus be determined.

Figure 10:
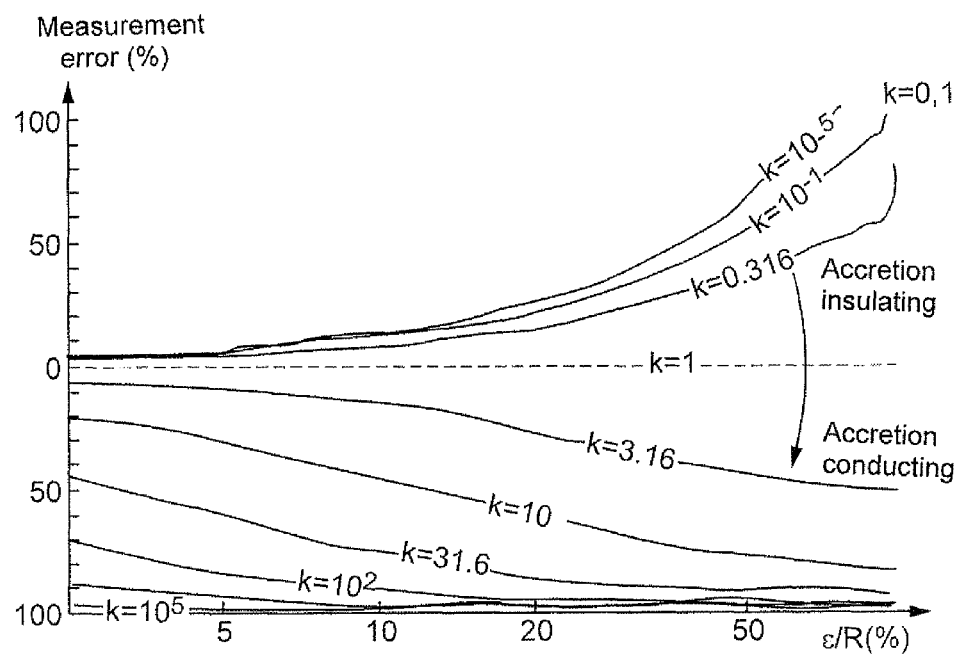
FIG. 10 is a graphical representation of measurement error of a magneto-inductive flow measuring system as a function of thickness of the accretion and the ratio of the electrical conductivity of the measured substance to the electrical conductivity of the accretion.

FIG. 10 shows in a graphical representation the effect of an accretion on the measurement error of a magneto-inductive flow measuring system 1.

Depending on the thickness ϵ and the conductivity of the accretion, due to the consequently resulting measurement error, different corrections must be performed. For an error correction of the measured value, an analysis of the accretion is consequently of decisive meaning.

The invention claimed is:

1. A method for operating a magneto-inductive flow measuring system, wherein the magneto-inductive flow measuring system has a measuring tube, the measuring tube has a lumen for conveying an at least slightly electrically conductive, measured substance, and the magneto-inductive flow measuring system has a first and a second electrode electrically interacting with the measured substance, comprising the steps of:

applying an input voltage in a first diagnostic operation, between the first and second electrodes, wherein the input voltage produces an electrical current essentially within the lumen;

providing the flow measuring system additionally with a third and a fourth electrode electrically interacting with the measured substance;

determining an output voltage falling between the third and fourth electrodes essentially due to the electrical current;

determining an input impedance present between the first electrode and the second electrode; and detecting, by means of a relationship formed between the output voltage and the input voltage and/or the input impedance, an accretion in given cases present on an inner wall of the measuring tube and/or on the first, second, third and/or fourth electrode, especially one deposited from the measured substance; wherein:

a thickness ($\epsilon$) of the accretion and/or a ratio K of the conductivity of the measured substance to the conductivity of the accretion are determined, especially determined by means of said relationship; and by means of the output voltage, a state of the flow measuring system and/or a chemical and/or physical property of the measured substance is determined.

2. The method as claimed in claim 1, further comprising the step of:

determining the electrical conductivity of the measured substance or a variable associated with the electrical conductivity by means of the output voltage.

3. The method as claimed in claim 1, further comprising the step of:

determining the input voltage applied between the first electrode and the second electrode and serving for impressing an essentially constant electrical current.

4. The method as claimed in claim 1, wherein:

at least one value obtained by means of the relationship is compared with at least one stored value.

5. The method as claimed in claim 1, further comprising the step of:

determining the conductivity of the measured substance and/or the conductivity of the accretion, especially a ratio k of the conductivity of the measured substance to the conductivity of the accretion.

6. The method as claimed in claim 1, wherein:

the first, second, third and fourth electrode are used in a measurement operation for measured substance monitoring and/or for determining flow and/or for determining a reference potential.

7. The method as claimed in claim 6, wherein:

for determining flow, a magnetic field is produced by means of a magnet system, wherein via this magnetic field, a measurement voltage is induced in the measured substance flowing through the measuring tube; and the measurement voltage is accessed by means of the first, second, third and/or fourth electrode.

8. The method as claimed in claim 3, wherein:

in a second diagnostic operation, the electrical conductivity of the measured substance, or the variable associated with the electrical conductivity, is determined solely from the input voltage and/or input impedance.

9. A magneto-inductive flow measuring system, comprising:

a measuring tube, which has a lumen for conveying an at least slightly electrically conductive, measured substance;

a first and a second electrode electrically interacting with the measured substance, said first and second electrodes serve to produce an electrical current essentially within the lumen; and a third and a fourth electrode, which electrically interact with the measured substance, wherein:

said third and fourth electrodes serve to access an output voltage falling between said third and fourth electrodes essentially as a function of the electrical current.

10. A method for operating a magneto-inductive flow measuring system, wherein the magneto-inductive flow measuring system has a measuring tube, the measuring tube has a lumen for conveying an at least slightly electrically conductive, measured substance, and the magneto-inductive flow measuring system has a first and a second electrode electrically interacting with the measured substance, comprising the steps of:

applying an input voltage in a first diagnostic operation, between the first and second electrodes, wherein the input voltage produces an electrical current essentially within the lumen;

providing the flow measuring system additionally with a third and a fourth electrode electrically interacting with the measuring substance; and determining an output voltage falling between the first and fourth electrode essentially due to the electrical current, wherein:

the first, second, third and fourth electrode are used in a measurement operation for measured substance monitoring and/or for determining flow and/or for determining a reference potential; measured values produced by the flow measuring system are corrected as a function of the ratio of the electrical conductivity of the measured substance to the electrical conductivity of the accretion ascertained in the first diagnostic operation, as well as dependent on the thickness ($\epsilon$) of the accretion; and by means of the output voltage, a state of the flow measuring system and/or a chemical and/or physical property of the measured substance is determined.

\* \* \* \* \*